United States Patent Office 2,819,147
Patented Jan. 7, 1958

2,819,147

PURIFICATION OF TITANIUM TETRACHLORIDE

Joseph S. Dunn, Dayton, Ohio, assignor to Monsanto Chemical Company, St. Louis, Mo., a corporation of Delaware No Drawing. Application November 26, 1952
Serial No. 322,798

6 Claims. (Cl. 23—87)

This invention relates to the purification of titanium tetrachloride, and more specifically to an improvement in the purification of titanium tetrachloride with reactive sulfides, such as hydrogen sulfide.

Technical grade titanium tetrachloride, as produced, for example, by the chlorination of titanium-bearing materials such as ilmenite, generally contains from about one to about five per cent or more of impurities such as iron, vanadium, molybdenum, and silicon compounds which have boiling points relatively close to the boiling point of titanium tetrachloride so that these impurities are not easily removed by distillation. One of the better methods of purification is by precipitation of the impurities with a reactive sulfiide, particularly hydrogen sulfide. This method of purification is described in some detail in the patents issued to Alphonse Pechukas, U. S. Patent Nos. 2,289,327 and 2,289,328, issued July 7, 1942. Upon fractionation of the liquid titanium tetrachloride which has been treated with the reactive sulfide, a water-white fraction is obtained. However, the quantity of the tetrachloride recovered as a water-white fraction is generally only about 70 or 80 percent of the quantity with which the purification was started.

I have now discovered an improved method for purifying titanium tetrachloride with reactive sulfides whereby the recovery of water-white product is substantially increased. This increased recovery is accomplished by contacting the sulfide-treated titanium tetrachloride with a basic compound of an alkali or alkaline earth metal. For example, by slurrying an $H_2S$— treated batch of titanium tetrachloride with solid calcium oxide, the yield of water-white liquid titanium tetrachloride can be increased (from 70 or 80 percent) to better than 85 or 90 percent, based upon the amount of liquid titanium tetrachloride charged to the purification process.

The term "basic compound," as used according to the present invention, is intended to cover those compounds which will react with or dissociate in water to give a substantial predominance of hydroxyl ions over hydrogen ions. Examples of such basic compounds are the alkali and alkaline earth metal oxides, hydroxides, and salts of weak acids such as carbonic acid, boric acid, acetic acid, etc. Specific suitable compounds are sodium oxide, calcium oxide, barium oxide, sodium hydroxide, potassium hydroxide, calcium hydroxide, sodium carbonate, calcium carbonate, tripotassium phosphate, sodium nitrite, sodium tetraborate, barium acetate, etc. It is preferred that the above-described basic compounds have a basicity at least as great as that of sodium acetate.

The sulfide-treated titanium tetrachloride can be contacted with the basic agents of this invention in various ways, such as by allowing the titanium tetrachloride liquid to percolate through a porous bed of the solid treating agent or by merely putting the basic agent in a finely divided solid form into the bulk of titanium tetrachloride liquid and agitating to insure adequate contacting. In the latter case, the solid may be separated from the liquid either by filtering or by decanting the liquid from the solid prior to distillation of the titanium tetrachloride. However, as will be seen from the examples presented hereinafter, the separation of the liquid and solid prior to distillation is not necessary.

The amount of basic agent to be used according to the present invention will depend largely upon the method and the efficiency of the contacting operation, but in general the amount will be at least about 0.25 or 0.5 weight percent based upon the liquid titanium tetrachloride contacted.

The following examples are presented as illustrative of the purificaiton process of the present invention, and of the advantages gained by the use of this process.

Example 1

Hydrogen sulfide gas was bubbled into 1000 grams of crude liquid titanium tetrachloride at a rate of about 24 mls. per minute for a period of about one hour. The titanium tetrachloride was continually agitated during the treatment with hydrogen sulfide. The solution was filtered to remove the dark brown precipitate resulting from the hydrogen sulfide treatment. The filtrate was fractionated in a four-foot column packed with 1/4" Berl saddles. The proportion of distillate coming over as water-white liquid was about 80 percent of the 1000 grams of crude titanium tetrachloride with which the purification was originally started.

Example 2

The procedure of Example 1 was repeated except that subsequent to the hydrogen sulfide treatment and prior to the filtration two percent by weight of technical calcium oxide was added to the titanium tetrachloride and agitated for five hours. This mixture was allowed to stand overnight at room temperature and then filtered. The filtrate was distilled as before, and a recovery of about 86 percent of water-white titanium tetrachloride was obtained.

Example 3

The procedure of Example 2 was followed except that the mixture was not filtered prior to the distillation. The recovery of titanium tetrachloride as water-white product was about 90 percent of the crude titanium tetrachloride originally charged to the purification process.

Example 4

Substantially the same results as were obtained in Example 2 or 3 are obtained by using sodium carbonate in place of calcium oxide.

What I claim:

1. In a process for purifying titanium tetrachloride containing other metal compounds as impurities therein, a first step comprising precipitating impurities by means of a reactive sulfide, followed by a second step consisting essentially of contacting the sulfide-treated titanium tetrachloride with a single solid basic compound of a metal selected from the group consisting of alkali and alkaline earth metals.

2. In a process for purifying titanium tetrachloride containing other metal compounds as impurities therein, a first step comprising precipitating impurities by means of hydrogen sulfide, followed by a second step consisting essentially of contacting the sulfide-treated titanium tetrachloride with a single solid oxide of a metal selected from the group consisting of alkali and alkaline earth metals.

3. The process for purifying titanium tetrachloride containing other metal compounds as impurities therein, said process comprising a first step of precipitating impurities with hydrogen sulfide, a second step consisting essentially of contacting the sulfide-treated titanium tetrachloride with a single solid oxide of a metal selected from the group consisting of alkali and alkaline earth metals, and a further step of distilling the resulting liquid to obtain a substantially increased yield of water-white liquid titanium tetrachloride.

4. The process for purifying titanium tetrachloride containing other metal compounds as impurities therein, said process comprising a first step of precipitating impurities with hydrogen sulfide, a second step consisting essentially of contacting the sulfide-treated titanium tetrachloride with a single solid alkaline earth metal oxide, and a further step of distilling the resulting liquid to obtain a substantially increased yield of water-white liquid titanium tetrachloride.

5. The process for purifying titanium tetrachloride containing other metal compounds as impurities therein, said process comprising a first step of precipitating impurities with hydrogen sulfide, a second step consisting essentially of contacting the sulfide-treated titanium tetrachloride with calcium oxide, and a further step of distilling the resulting liquid to obtain a substantially increased yield of water-white liquid titanium tetrachloride.

6. The process for purifying titanium tetrachloride containing other metal compounds as impurities therein, said process comprising a first step of precipitating impurities with hydrogen sulfide, a second step consisting essentially of contacting the sulfide-treated titanium tetrachloride with sodium carbonate, and a further step of distilling the resulting liquid to obtain a substantially increased yield of water-white liquid titanium tetrachloride.

References Cited in the file of this patent

UNITED STATES PATENTS

| | | |
|---|---|---|
| 2,289,328 | Pechukas | July 7, 1942 |
| 2,370,525 | De Witt | Feb. 27, 1945 |
| 2,560,423 | Espenscheid | July 10, 1951 |
| 2,598,897 | Espenscheid | June 3, 1952 |

OTHER REFERENCES

"Titanium," by Jelks Barksdale, 1949 ed., pages 322, 323. The Ronald Press Co., New York.

"Baker's Analyzed," C. P. Chemicals and Acids Catalog, Jan. 1, 1935, pages 42, 43.